J. A. GOULD.
RAKE.
APPLICATION FILED JAN. 17, 1914.
1,139,270.
Patented May 11, 1915.
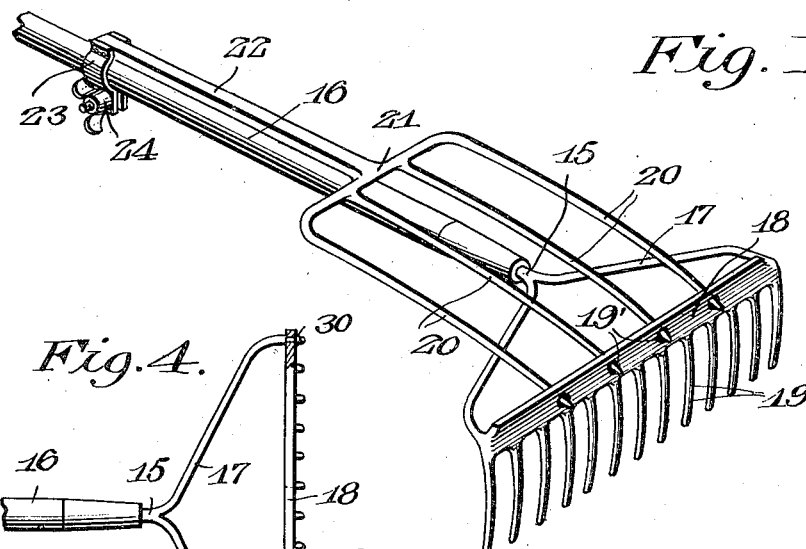
Fig. 1.
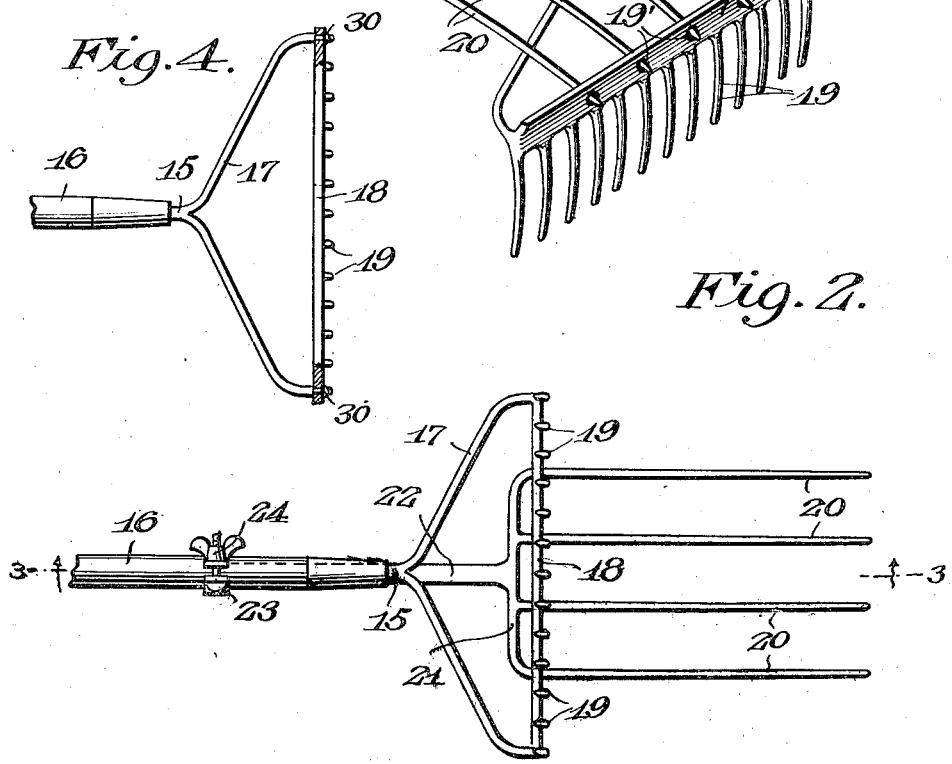
Fig. 4.
Fig. 2.
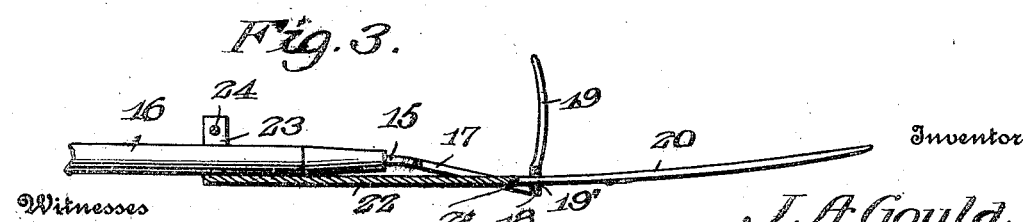
Fig. 3.
Witnesses
Inventor
J. A. Gould
By Victor J. Evans
Attorney

UNITED STATES PATENT OFFICE.

JAMES A. GOULD, OF EL RENO, OKLAHOMA.

RAKE.

1,139,270.  Specification of Letters Patent.  Patented May 11, 1915.

Application filed January 17, 1914. Serial No. 812,763.

*To all whom it may concern:*

Be it known that I, JAMES A. GOULD, a citizen of the United States, residing at El Reno, in the county of Canadian and State of Oklahoma, have invented new and useful Improvements in Rakes, of which the following is a specification.

This invention relates to farm implements, and it has special reference to an improved rake and fork.

The invention has for its prime object to produce a simple and efficient combination tool which may be utilized as an ordinary hay rake and also as a fork for handling hay and like materials.

A further object of the invention is to provide a combination tool of the character described in which the tines of the fork will not interfere with the teeth of the rake, and vice versa, thus enabling the implement to be conveniently used in the desired manner.

With these and other ends in view, which will readily appear when the nature of the invention is better understood, the same consists in the improved construction, arrangement and combination of parts which will be hereinafter fully described, and particularly pointed out in the claim.

In the drawing there has been shown a simple and preferred form of the invention, it being, however, understood that no limitation is necessarily made to the precise structural details therein exhibited, but that changes, alterations and modifications within the scope of the annexed claim may be made when desired.

In the drawing:—Figure 1 is a perspective view of the device showing the tines of the fork retracted, so that the device constitutes a rake. Fig. 2 is a plan view showing the tines of the fork projected so that the device may be used as a fork. Fig. 3 is a longitudinal sectional view taken on the line 3—3 in Fig. 2, Fig. 4 is a transverse sectional view showing a modification.

Corresponding parts in the several figures are denoted by like characters of reference.

A shank 15 which is adapted to be socketed in a handle 16 is provided with a terminal yoke 17 having a bridge piece 18 which constitutes a rake head, said bridge piece being provided with teeth 19 which are formed substantially at right angles thereto. The rake head is provided with a plurality of apertures 19' for the passage of the tines 20 of an ordinary fork, said tines being connected with a head 21, having a shank or handle 22 which is provided with a terminal sleeve 23 that encircles the handle member 16. Said sleeve is provided with a fastening member, such as a set screw 24 which may be tightened against the handle 16 for the purpose of retaining the fork in position at various adjustments. The tines of the fork are curved in the direction of the ends of the rake teeth, and it will be readily seen that when the tines of the fork are projected through and beyond the rake head, as seen in Fig. 1, the device is capable of being successfully used as a fork; when, on the other hand, the tines of the fork are retracted, as seen in Fig. 1, and the parts are securely assembled in such fashion that the extreme points of the tines will rest in the apertures 19', the device may be successfully used as a rake. It will be further observed that when the device is used as a fork, the rake teeth will project upwardly with respect to the fork tines which are curved in the direction of the ends or points of the rake teeth, and the latter will thus constitute a guard which will assist in preventing material from dropping from the fork when the latter is utilized for handling or tossing material; in like fashion, it will be seen that the fork tines, when retracted, will constitute a shield or guard to prevent material from passing over the rake head when the rake is utilized as such.

While the rake head may be formed integrally with the yoke 20 to form a bridge or connecting piece, as seen in Figs. 1, 2 and 3, it is regarded as entirely within the scope of the invention to construct the rake head separate, as seen at 30 in Fig. 4, and to attach the same to the yoke in any manner.

Having thus described the invention, what is claimed, is:—

A rake head having teeth projecting downwardly therefrom, said head being provided with a plurality of transverse apertures, a handle on which said rake head is fixed, a fork having tines guided through the apertures of the rake head, said tines being curved in the direction of the free ends of the rake teeth, a shank extending from the head of the fork and lying adjacent to the rake handle, and a clamp connected with said shank and engaging the rake handle to secure the fork at various adjustments.

In testimony whereof I affix my signature in presence of two witnesses.

JAMES A. GOULD.

Witnesses:
CLYDE MATTHEWS,
EARL G. MORRIS.